US012586357B2

(12) United States Patent
Karube

(10) Patent No.: US 12,586,357 B2
(45) Date of Patent: Mar. 24, 2026

(54) COLLECTING METHOD FOR TRAINING DATA

(71) Applicant: HONDA MOTOR CO., LTD., Tokyo (JP)

(72) Inventor: Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 419 days.

(21) Appl. No.: 18/191,256

(22) Filed: Mar. 28, 2023

(65) Prior Publication Data

US 2023/0316725 A1      Oct. 5, 2023

(30) Foreign Application Priority Data

Mar. 30, 2022    (JP) ................................. 2022-057617

(51) Int. Cl.
| | |
|---|---|
| *G06V 10/774* | (2022.01) |
| *G06T 7/00* | (2017.01) |
| *G06V 10/40* | (2022.01) |
| *G06V 10/764* | (2022.01) |

(52) U.S. Cl.
CPC .......... G06V 10/774 (2022.01); G06T 7/0004 (2013.01); G06V 10/40 (2022.01); G06V 10/764 (2022.01); *G06T 2207/20081* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 12,056,210 | B2 * | 8/2024 | Tae ........................ | G06N 20/00 |
| 2020/0380414 | A1 | 12/2020 | Ueno | |
| 2022/0405605 | A1 * | 12/2022 | Yokoyama ............. | G06N 3/045 |

FOREIGN PATENT DOCUMENTS

JP        2020-194355  A      12/2020

* cited by examiner

*Primary Examiner* — Leon Viet Q Nguyen
(74) *Attorney, Agent, or Firm* — Carter, DeLuca & Farrell LLP

(57) ABSTRACT

The present invention relates to a collecting method for training data for collecting defective product data as training data for learning a classification model that classifies the inspected object as a normal product or an abnormal product, including: collecting many pieces of defective product data (step 1 of FIG. 3); extracting a plurality of feature quantities respectively from many pieces of the defective product data (step 2); calculating a state sum for every feature quantity of the plurality of feature quantities that have been extracted, for the many pieces of the defective product data (step 3); calculating, as an index value, a logarithmic sum of a plurality of state sums that have been calculated (step 4); and ending collecting the defective product data, in a case where the calculated index value is equal to or greater than a predetermined target value (step 5).

1 Claim, 6 Drawing Sheets

F I G. 1
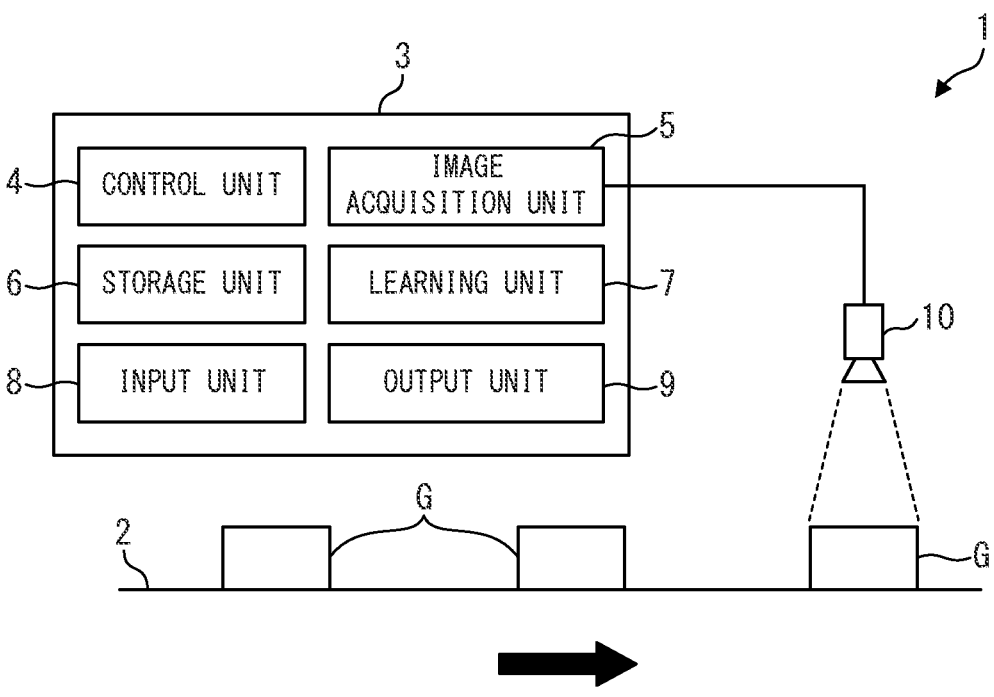
F I G. 2
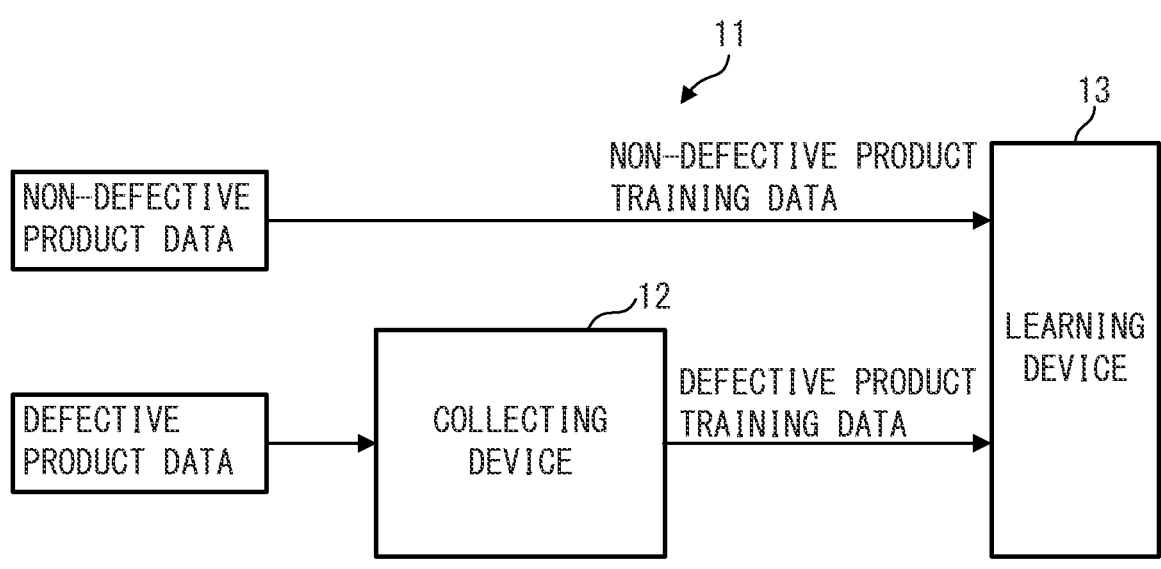

F I G. 3
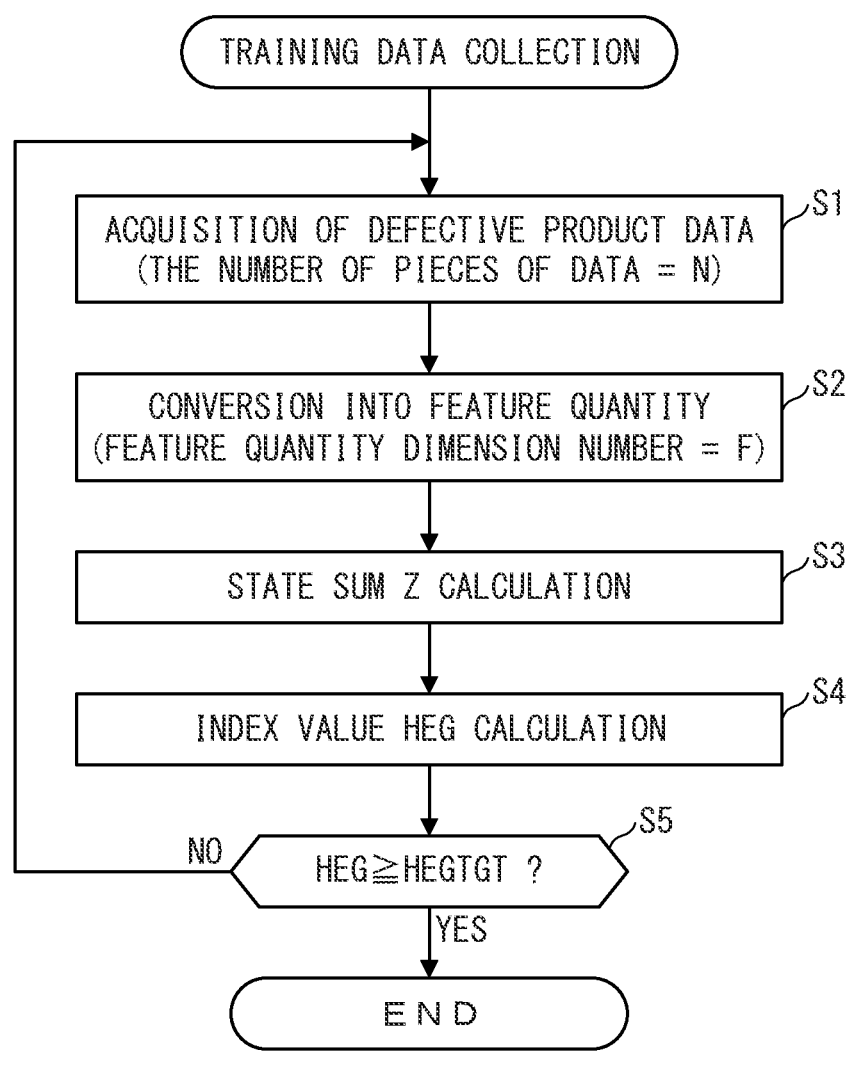

F I G. 4

F=50

| | 1 | 2 | 3 | 4 | 5 | 6 | 7 | 8 | 9 | 10 | ... | 41 | 42 | 43 | 44 | 45 | 46 | 47 | 48 | 49 | 50 |
|---|---|---|---|---|---|---|---|---|---|---|---|---|---|---|---|---|---|---|---|---|---|
| 1 | 114.0 | 43.0 | 78.693 | 6.614 | 43.739 | 0.245 | 3.257 | 105.0 | 103.0 | 100.0 | ... | 2.0 | 2.0 | 1.0 | 2.0 | 1.0 | 1.0 | 2.0 | 3.0 | 0.0 | 0.0 |
| 2 | 122.0 | 43.0 | 78.748 | 7.301 | 53.301 | 0.330 | 3.343 | 108.0 | 106.0 | 104.0 | ... | 2.0 | 2.0 | 1.0 | 2.0 | 1.0 | 1.0 | 2.0 | 3.0 | 0.0 | 1.0 |
| 3 | 122.0 | 43.0 | 79.176 | 7.744 | 59.974 | 0.342 | 3.335 | 110.0 | 108.0 | 106.0 | ... | 2.0 | 2.0 | 2.0 | 1.0 | 1.0 | 2.0 | 1.0 | 3.0 | 0.0 | 1.0 |
| 4 | 125.0 | 43.0 | 79.014 | 8.099 | 65.593 | 0.413 | 3.217 | 111.0 | 109.0 | 107.0 | ... | 2.0 | 2.0 | 2.0 | 1.0 | 1.0 | 1.0 | 2.0 | 3.0 | 1.0 | 1.0 |
| 5 | 122.0 | 37.0 | 77.474 | 6.679 | 44.609 | 0.618 | 4.504 | 109.0 | 106.0 | 104.0 | ... | 1.0 | 1.0 | 2.0 | 1.0 | 2.0 | 1.0 | 2.0 | 8.0 | 1.0 | 0.0 |
| ... | ... | ... | ... | ... | ... | ... | ... | ... | ... | ... | ... | ... | ... | ... | ... | ... | ... | ... | ... | ... | ... |
| 952 | 100.0 | 47.0 | 71.197 | 5.522 | 30.497 | 0.401 | 3.379 | 93.0 | 91.0 | 90.0 | ... | 1.0 | 2.0 | 1.0 | 1.0 | 1.0 | 3.0 | 3.0 | 2.0 | 0.0 | 1.0 |
| 953 | 122.0 | 35.0 | 78.028 | 8.535 | 72.854 | -0.100 | 6.788 | 114.0 | 112.0 | 109.0 | ... | 2.0 | 2.0 | 2.0 | 21.0 | 4.0 | 1.0 | 1.0 | 0.0 | 1.0 | 0.0 |
| 954 | 101.0 | 36.0 | 74.632 | 6.079 | 36.950 | -1.518 | 11.770 | 94.0 | 92.0 | 91.0 | ... | 2.0 | 2.0 | 2.0 | 20.0 | 4.0 | 1.0 | 7.0 | 0.0 | 0.0 | 0.0 |
| 955 | 130.0 | 40.0 | 88.281 | 8.077 | 65.238 | 0.115 | 3.910 | 118.0 | 116.0 | 114.0 | ... | 2.0 | 2.0 | 2.0 | 2.0 | 2.0 | 12.0 | 7.0 | 3.0 | 0.0 | 1.0 |
| 956 | 149.0 | 37.0 | 92.992 | 10.146 | 102.978 | 0.157 | 4.147 | 135.0 | 131.0 | 128.0 | ... | 4.0 | 2.0 | 2.0 | 2.0 | 4.0 | 13.0 | 10.0 | 3.0 | 1.0 | 2.0 |

N=956

956 ROWS × 50 COLUMNS $$Z_k = a * \sum_{i=1}^{N} \exp\left(-\frac{(x_i - m_{k,N})^2}{\sigma_N^2}\right)$$

COLLECTING METHOD FOR TRAINING DATA

BACKGROUND

Technical Field

The present invention relates to a collecting method for training data for use in learning by an inspection device or the like having a machine learning function that uses a neural network.

Related Art

In recent years, with an inspection device having a machine learning function that uses a neural network, progress has been made on the development of automation technology in an inspection operation for determining whether inspected objects such as various types of industrial products or parts are each a normal product (non-defective product) or an abnormal product (defective product). In such an inspection device, machine learning is performed by reading, as training data, many pieces of image data of appearances of the inspected objects that have been classified as the non-defective products and the defective products, and the classification model is learned. Then, using the classification model that has been learned, the inspection device becomes capable of classifying a new inspected object that has been imaged by a camera as a non-defective product or a defective product.

As described above, image data of the non-defective product and the defective product is used as the training data in machine learning of the classification model. Hence, many pieces of image data are necessary for both the non-defective product and the defective product in order to improve inspection accuracy (classification accuracy). However, in a manufacturing site of industrial products and the like, in general, the products are manufactured to produce defective products as few as possible, and thus, there are a lot of non-defective products, whereas there are a very few defective products. For this reason, collection of the image data of the non-defective product (hereinafter, referred to as "non-defective product data") is relatively easy, whereas collection of the image data of the defective product (hereinafter, referred to as "defective product data") tends to hardly proceed.

In addition, in such an inspection device, when image data having a data pattern that has not been learned by the classification model is input as the image data of the inspected object, it is difficult to classify it appropriately. Hence, training data for use in learning of the classification model is demanded to be good in quality that covers as many data patterns as possible. In other words, in a case where the collection of the training data is insufficient and training data that is poor in quality in which the data patterns are not sufficiently covered is given, the classification model with high accuracy cannot be constructed. As described above, in order to ensure the accuracy of the classification model by the machine learning, there is a demand particularly for the defective product training data to be good in quality that covers a lot of data patterns, in addition to sufficiency in amount.

As a collection system for training data for use in the machine learning as described above, for example, the system disclosed in JP 2020-194355 A has been conventionally known. In such a collection system, a classification model is used for setting a user environment in performing an inspection operation of classifying a machining state of an inspected object as normal or abnormal, and in addition, a learning device that learns the classification model and provides the classification model for the user environment is included. Labeled data obtained at the time of inspection operation is transmitted from the user environment side to the learning device. The learning device determines whether the label of the data is appropriate or not, by using an existing classification model. Then, in a case where it is determined that the data is appropriate, the labeled data is adopted as additional training data, and the classification model is reconstructed, whereas in a case where it is determined that the data is inappropriate, the labeled data is excluded from the training data.

SUMMARY

In the above-described conventional training data collection system, data applied with an inappropriate label is prevented from being mixed as the training data. However, in such a collection system, no evaluation is carried out for the quality or the amount of the training data itself that has been collected. Hence, in a state in which the quality or the amount of the defective product data that has been collected is insufficient, the learning of the classification model is performed. As a result, it may not be possible to ensure high classification accuracy. In addition, from the same reason, it is not possible to determine the timing to end the collection of the defective product data accurately. Even though the training data of sufficient quality and amount is obtained, the collection of the training data may continue in an unnecessary manner.

The present invention has been made to address the above drawbacks, and has an object to provide a collecting method for training data, capable of quantitatively and appropriately evaluating the quality and the amount of defective product data that has been collected as the training data, and thus learning of a classification model is enabled with high accuracy by use of the training data of sufficient quality and amount, the collection of the defective product data ends at an optimum timing, and the man-hour for the collection can be minimized.

In order to achieve the above object, according to a first aspect, a collecting method for training data for collecting defective product data that is image data obtained by imaging an appearance of an inspected object G that has been determined to be an abnormal product by an inspection operator, as the training data for learning a classification model that classifies the inspected object G as a normal product or the abnormal product, the collecting method includes: collecting many pieces of the defective product data (step 1 of FIG. 3); extracting a plurality of feature quantities respectively from the many pieces of the defective product data that have been collected (step 2); calculating, in an expression (1), a state sum Zk for every feature quantity of the plurality of feature quantities that have been extracted, for the many pieces of the defective product data (step 3); calculating, in an expression (2), as an index value HEG, a logarithmic sum of a plurality of state sums Zk that have been calculated (step 4); and ending collecting the defective product data, in a case where the index value HEG that has been calculated is equal to or greater than a predetermined target value HEGTGT (step 5).

[Expression 1]

$$Z_k = a * \sum_{i=1}^{N} \exp\left(-\frac{(x_i - mu_N)^2}{\sigma_N^2}\right) \quad (1)$$

$Z_k$:STATE SUM FOR EVERY FEATURE QUANTITY

OF ALL PIECES OF DEFECTIVE PRODUCT DATA $N$:THE NUMBER OF PIECES OF DEFECTIVE PRODUCT DATA $x_i$:VALUE OF FEATURE QUANTITY OF

EACH PIECE OF DEFECTIVE PRODUCT DATA $mu_N$:AVERAGE VALUE FOR EVERY FEATURE QUANTITY

OF ALL PIECES OF DEFECTIVE PRODUCT DATA $\sigma_N$:STANDARD DEVIATION $a$:NORMALIZATION CONSTANT

[Expression 2]

$$HEG = \sum_{k=1}^{F} \log Z_k \quad (2)$$

$HEG$:INDEX VALUE $F$:DIMENSION NUMBER OF FEATURE QUANTITY

In the collecting method for training data in the present invention, the defective product data, which is image data obtained by imaging the appearance of the inspected object that has been determined as the abnormal product by the inspection operator, is collected as the training data for learning the classification model that classifies the inspected object as a normal product or an abnormal product. According to the present invention, a plurality of feature quantities are extracted from each of many pieces of the defective product data that have been collected, and in addition, the state sum $Z_k$ for every feature quantity of the plurality of feature quantities is calculated for many pieces of the defective product data, in the expression (1).

The technical significance of the state sum $Z_k$ will be described as follows. That is, in a case where a non-expert (a newcomer or an operator with short years of experience) performs an inspection operation for an inspected object, defective product data to be selected is generally limited to data patterns that are relatively likely to occur. For this reason, in a case where such a non-expert extracts feature quantities from many pieces of defective product data, the feature quantities are in a distribution state concentrated in the vicinity of the average value of all pieces of the defective product data, and the standard deviation becomes small. In addition, from the expression (1), the state sum $Z_k$ has characteristics that as the standard deviation $\sigma_N$ is larger, the state sum $Z_k$ becomes larger, and the standard deviation $\sigma_N$ is smaller, the state sum $Z_k$ gets closer to a value 1. In this manner, the state sum $Z_k$ favorably reflects the quality as training data for every feature quantity, and represents that as its value is larger, the feature quantities are distributed from the average value, and are in a good quality state. Note that a normalization constant $a$ is a coefficient for adjusting the logarithm of the state sum $Z_k$ to a value 0.

Next, a logarithmic sum of the plurality of state sums $Z_k$ for every feature quantity is calculated as the index value HEG, in the expression (2). From the above-described characteristics of the state sum $Z_k$, the index value HEG favorably reflects the quality and the amount of all pieces of the defective product data that have been collected as the training data. As its value is larger, the quality and the amount as the training data become higher. Therefore, according to the present invention, in a case where the index value HEG that has been calculated becomes equal to or greater than a predetermined target value, it is determined that the training data of sufficient quality and amount has been obtained, and the collection of the defective product data ends.

As described above, the quality and the amount of the defective product data that has been collected as the training data can be quantitatively and appropriately evaluated by use of the index value HEG. Accordingly, it is possible to learn the classification model with high accuracy by using the training data of sufficient quality and amount, and in addition, it is possible to end the collection of the defective product data at an optimum timing, so that the man-hour for the collection can be minimized. In addition, by appropriately setting the normalization constant $a$, the logarithm of the state sum $Z_k$ related to the feature quantity with little influence becomes a value close to 0, and thus it is possible to appropriately and easily calculate the index value HEG, while automatically deleting the term related to such a feature quantity.

BRIEF DESCRIPTION OF DRAWINGS

FIG. 1 is a diagram schematically illustrating an inspection system that inspects an inspected object by using a classification model that has been learned, based on training data that has been collected;

FIG. 2 is a diagram illustrating a collecting device for defective product data and a learning device of the classification model;

FIG. 3 is a flowchart illustrating collection processing for collecting training data;

FIG. 4 is a diagram illustrating an example of a feature quantity that has been obtained by conversion processing in FIG. 3;

DETAILED DESCRIPTION

Figure 5:
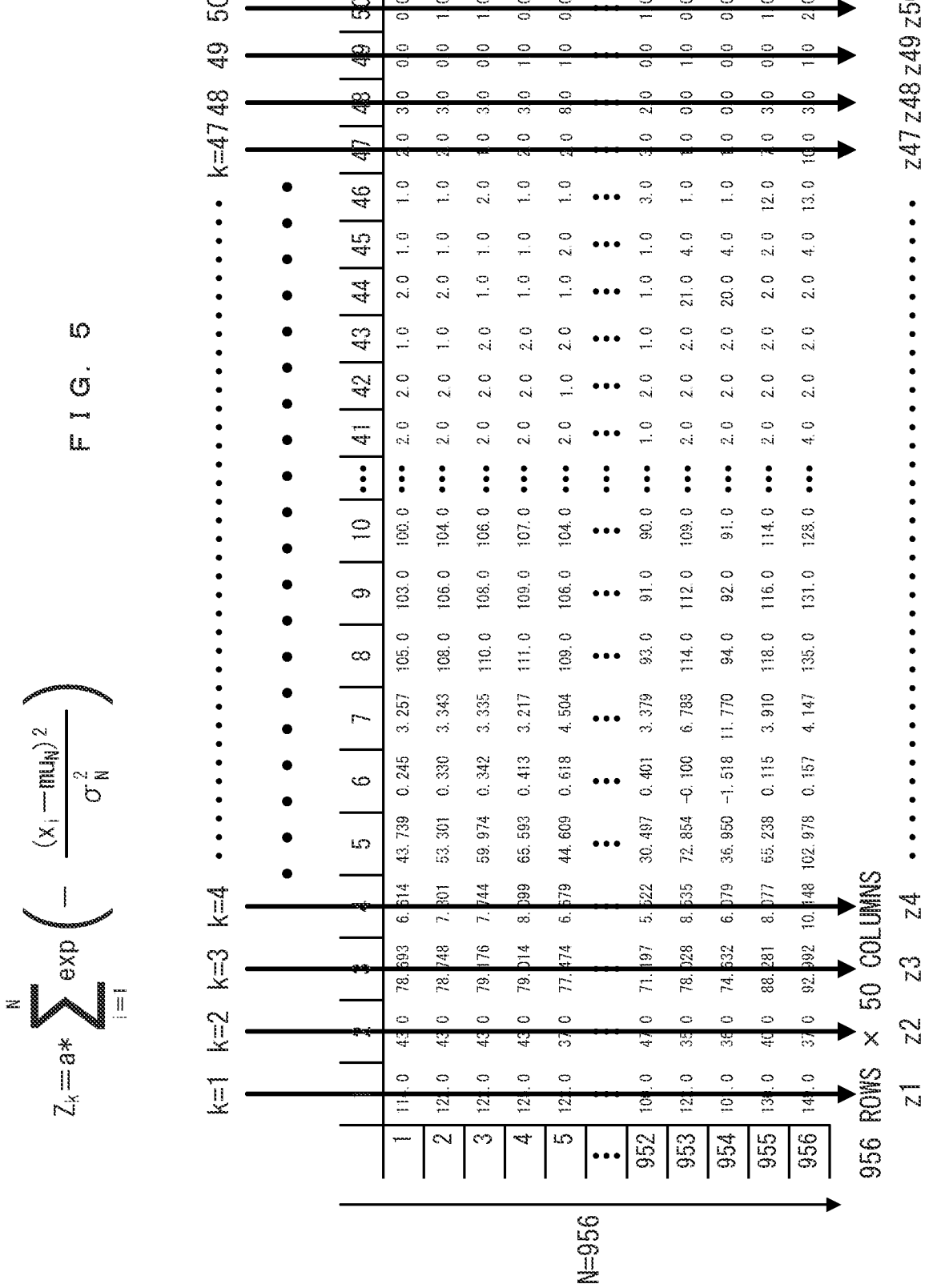
FIG. 5 is a diagram illustrating a relationship between a feature quantity and a state sum in FIG. 4.

Hereinafter, preferred embodiments of the present invention will be described in detail with reference to the drawings. FIG. 1 illustrates an inspection system including a classification model that has been learned by use of pieces of data of a large number of defective product images (hereinafter, referred to as "defective product data") that have been collected by a collecting method to be described later and pieces of data of a large number of non-defective product images (hereinafter, referred to as "non-defective product data"). Such an inspection system 1 is installed in, for example, a manufacturing factory of vehicle components, and by inspecting an appearance of a vehicle component using a classification model, automatically determines whether a manufactured vehicle component (for example, a cylinder block) is a normal product (non-defective product) or an abnormal product (defective product). Hereinafter, a vehicle component to be inspected will be referred to as an "inspected object".

As illustrated in FIG. 1, the inspection system 1 includes a conveyor 2 for conveying an inspected object Gin one direction at a predetermined speed, and an inspection device 3 for determining the quality of the inspected object G, when the inspected object G reaches a predetermined inspection position. The inspected object G that has been determined to be a defective product by the inspection device 3 is removed from, for example, the conveyor 2, and is conveyed to a storage place dedicated to the defective products.

The inspection device 3 is configured with an information processing device including a computer and the like, and includes a control unit 4, an image acquisition unit 5, a storage unit 6, a learning unit 7, an input unit 8, an output unit 9, and a camera 10.

The control unit 4 includes a CPU, and controls the other respective units 5 to 9, and the camera 10 of the inspection device 3. The image acquisition unit 5 acquires, as digital data, image data of the appearance of the inspected object G that has been imaged by the camera 10. The storage unit 6 includes a ROM and a RAM, stores various programs to be used in the control of the inspection device 3 in the ROM, and also stores various types of data that have been acquired for the control in the RAM. The learning unit 7 includes a classification model for determining the quality of the inspected object G. The input unit 8 includes a keyboard or the like to be operated by an operator, and in addition, data and signals can be input from the outside. The output unit 9 includes a display or the like that displays a determination result of the quality of the inspected object G.

As illustrated in FIG. 2, a learning system 11, which learns the above classification model, includes a collecting device 12 for training data, and a learning device 13 of the classification model. The collecting device 12 is for collecting data of a defective product that has been actually determined to be the defective product by the inspection device 3, as training data having desired quality and amount, in collection processing to be described later. Similarly to the inspection device 3, the collecting device 12 is configured with an information processing device including a computer and the like, and includes a control unit including a CPU, a storage unit including a ROM and a RAM, an input unit, and an output unit (none of which is illustrated).

The learning device 13 learns the classification model using the neural network, by use of many pieces of non-defective product training data that have been already collected from many pieces of non-defective product data that have been actually determined to be non-defective products by the inspection device 3 and many pieces of defective product training data that have been collected by the collecting device 12.

FIG. 3 illustrates collection processing for collecting training data to be performed in the collecting device 12. In the present processing, first, in step 1 (indicated as "S1" in the drawing. Hereinafter, the same will apply), many pieces of defective product data (the number of pieces of data=N) that have been obtained by the inspection device 3 are acquired.

Next, in step 2, the respective N pieces of defective product data that have been acquired are converted into a plurality of predetermined feature quantities (feature quantity dimension number=F), and are stored in the storage unit. This conversion from the defective product data into the feature quantity is conducted by use of, for example, scale-invariant feature transform (SIFT) or convolution neural network (CNN). Accordingly, as illustrated in FIG. 4, the feature quantity of the dimension number F is obtained for each of the N pieces of defective product data. FIG. 4 illustrates an example of a case where the number of defective product data N=956 and the number of dimensions F=50.

Next, in step 3, a state sum Z is calculated in a following expression (1).

[Expression 1]

$$Z_k = a * \sum_{i=1}^{N} \exp\left(-\frac{(x_i - mu_N)^2}{\sigma_N^2}\right) \tag{1}$$

$Zk$:STATE SUM FOR EVERY FEATURE QUANTITY

OF ALL PIECES OF DEFECTIVE PRODUCT DATA $N$:THE NUMBER OF PIECES OF DEFECTIVE PRODUCT DATA $xi$:VALUE OF FEATURE QUANTITY OF

EACH PIECE OF DEFECTIVE PRODUCT DATA $muN$:AVERAGE VALUE FOR EVERY FEATURE QUANTITY

OF ALL PIECES OF DEFECTIVE PRODUCT DATA $\sigma N$:STANDARD DEVIATION $a$:NORMALIZATION CONSTANT Accordingly, as illustrated in FIG. 5, a total of 50 state sums Zk (Z1 to Z50) for every feature quantity over all pieces of defective product data are calculated. As described above, the state sum Zk favorably reflects the quality as the training data for every feature quantity. As its value is larger, the feature quantities are distributed from the average value, and are in a better state. In addition, the state sum Zk has characteristics that as a standard deviation σN is larger, the state sum Zk becomes larger, and the standard deviation σN is smaller, the state sum Zk gets closer to the value 1. Note that a normalization constant a is a coefficient for adjusting the logarithm of the state sum Zk to a value 0, and is manually set so that the logarithm of the state sum Zk becomes the value 0, while viewing the results of the feature quantities as illustrated in FIG. 4.

Figure 6:
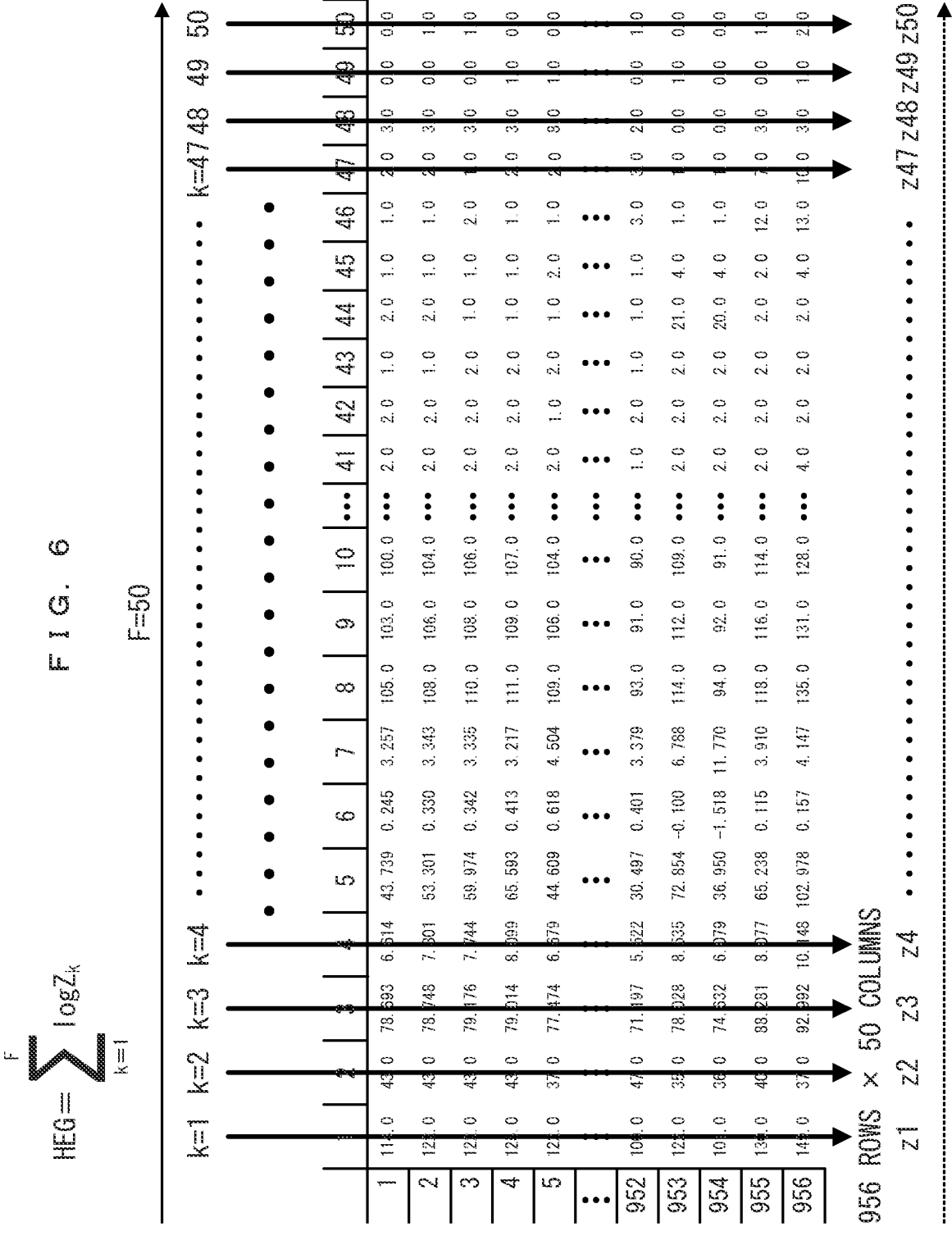
FIG. 6 is a diagram illustrating a relationship between the state sum and an index value in FIG. 5.

Next, in step 4, a logarithmic sum of the plurality of state sums Zk that have been calculated is calculated as an index value HEG in a following expression (2). Accordingly, as illustrated in FIG. 6, one index value HEG for all the pieces of defective product data and all the feature quantities is calculated. As described above, the index value HEG favorably reflects the quality and the amount of all the pieces of defective product data that have been collected as the training data. As its value is larger, which represents that its quality and amount as the training data become higher.

[Expression 2]

$$HEG = \sum_{k=1}^{F} \log Z_k \tag{2}$$

$HEG$:INDEX VALUE $F$:DIMENSION NUMBER OF FEATURE QUANTITY

Next, in step 5, it is determined whether the index value HEG that has been calculated is equal to or higher than a predetermined target value HEGTGT. In a case where a determination result is NO and the index value HEG does not reach the target value HEGTGT, it is determined that the quality and/or the amount of the defective product data that has been collected as the training data is insufficient, and the processing returns to step 1 to further acquire the defective product data. On the other hand, in a case where the determination result in step 5 is YES and the index value HEG reaches the target value HEGTGT, it is determined that the quality and the amount of the defective product data as the training data have been ensured sufficiently, the collection of the defective product data ends, and the processing ends.

As described above, according to the present embodiment, the quality and the amount of the defective product data that has been collected as the training data can be quantitatively and appropriately evaluated by the index value HEG. Accordingly, the classification model can be learned with high accuracy by use of the training data of sufficient quality and amount, and the collection of the defective product data ends at an optimum timing, so that the man-hour for the collection can be minimized.

In addition, by appropriately setting the normalization constant a, the logarithm of the state sum Zk related to the feature quantity with little influence becomes a value close to 0, and thus it is possible to appropriately and easily calculate the index value HEG, while automatically deleting the term related to such a feature quantity.

Figure 7:
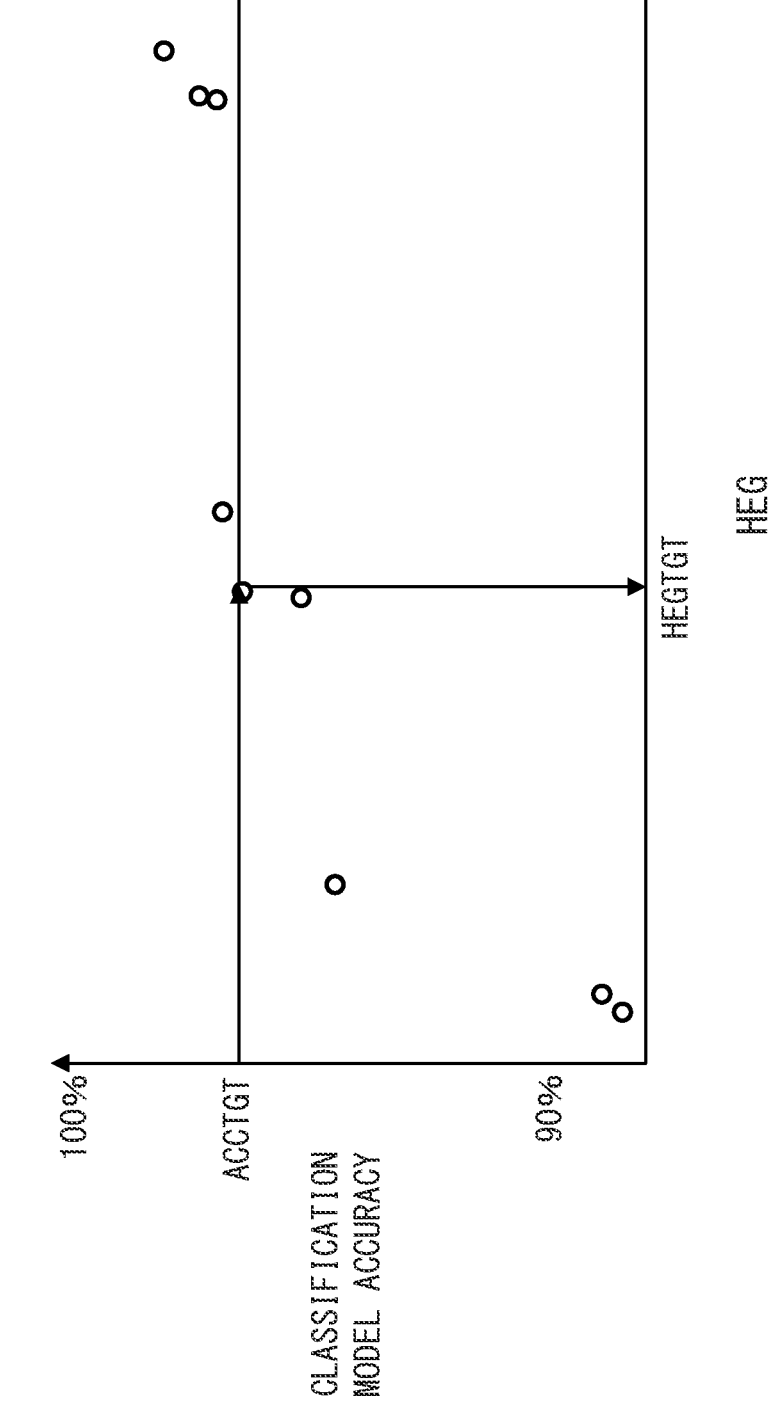
FIG. 7 is a diagram illustrating a relationship between the index value and accuracy of the classification model.

FIG. 7 illustrates a relationship between the index value HEG that has been calculated as described above and the classification accuracy of test data (the non-defective product data and the defective product data) by the classification model the has been learned by use of the defective product data that has been collected until the index value HEG reaches the target value HEGTGT. As illustrated in FIG. 7, as the index value HEG is larger, the classification accuracy by the classification model becomes higher. It has been confirmed that the index value HEG is effective as a parameter representing the quality and the amount of the training data. In addition, the target value HEGTGT of the index value that serves as a reference in determining the end of collection of the training data, based on the relationship between the index value HEG and the classification accuracy, is set to a value corresponding to a target value ACCTGT of the classification accuracy by the classification model.

Note that the present invention is not limited to the embodiments described above, but may be implemented in various modes. For example, in an embodiment, by applying the normalization constant a to the state sum Z, the term related to the feature quantity with little influence is to be automatically deleted from the index value HEG. However, the normalization constant a can be omitted.

In addition, the number of dimensions F of the feature quantity, the number of defective product data N, and the like that have been indicated in the embodiments are examples. It is needless to say that any other appropriate value may be adopted. Furthermore, in an embodiment, the description has been given with regard to an example in which whether the vehicle component is a non-defective product or a defective product is inspected by the classification model that has been learned by use of the collected training data. However, the present invention is not limited to this. As long as it is a classification model for inspecting the non-defective product and the defective product, it is widely applicable to the collection of the training data therefor. In addition, the detailed configuration can be appropriately changed within the scope of the gist of the present invention.

What is claimed is:

1. A collecting method for training data for collecting defective product data that is image data obtained by imaging an appearance of an inspected object that has been determined to be an abnormal product by an inspection operator, as the training data for learning a classification model that classifies the inspected object as a normal product or the abnormal product, the collecting method comprising:

collecting many pieces of the defective product data;

extracting a plurality of feature quantities respectively from the many pieces of the defective product data that have been collected;

calculating, in an expression (1), a state sum Zk for every feature quantity of the plurality of feature quantities that have been extracted, for the many pieces of the defective product data, wherein the extracting and calculating are performed on multi-dimensional feature vectors derived from image data of the inspected object;

calculating, in an expression (2), as an index value HEG, a logarithmic sum of a plurality of state sums Zk that have been calculated; and ending collecting the defective product data, in a case where the index value HEG that has been calculated is equal to or greater than a predetermined target value

[Expression 1]

$$Z_k = a * \sum_{i=1}^{N} \exp\left(-\frac{(x_i - mu_N)^2}{\sigma_N^2}\right) \qquad (1)$$

$Zk$:STATE SUM FOR EVERY FEATURE QUANTITY

OF ALL PIECES OF DEFECTIVE PRODUCT DATA $N$:THE NUMBER OF PIECES OF DEFECTIVE PRODUCT DATA $xi$:VALUE OF FEATURE QUANTITY OF

EACH PIECE OF DEFECTIVE PRODUCT DATA $muN$:AVERAGE VALUE FOR EVERY FEATURE QUANTITY

OF ALL PIECES OF DEFECTIVE PRODUCT DATA $\sigma N$:STANDARD DEVIATION $a$:NORMALIZATION CONSTANT

[Expression 2]

$$HEG = \sum_{k=1}^{F} \log Z_k \qquad (2)$$

$HEG$:INDEX VALUE $F$:DIMENSION NUMBER OF FEATURE QUANTITY

* * * * *